United States Patent [19]

O'Driscoll

[11] Patent Number: 4,631,154

[45] Date of Patent: Dec. 23, 1986

[54] METHOD OF CONSTRUCTING A DOME RESTRAINT ASSEMBLY FOR ROCKET MOTORS

[75] Inventor: Peter F. O'Driscoll, Los Altos, Calif.

[73] Assignee: The United States of America as represented by the Secretary of the Air Force, Washington, D.C.

[21] Appl. No.: 805,680

[22] Filed: Dec. 6, 1985

Related U.S. Application Data

[62] Division of Ser. No. 586,952, Mar. 7, 1984, Pat. No. 4,577,542.

[51] Int. Cl.[4] ............................................. C06B 21/00
[52] U.S. Cl. ...................................... 264/3.1; 264/3.3; 102/287; 102/291; 60/253
[58] Field of Search .................. 264/3.1, 3.3; 102/287, 102/289, 290; 86/20 D; 60/253, 255; 425/951

[56] References Cited

U.S. PATENT DOCUMENTS

| | | | |
|---|---|---|---|
| 3,362,159 | 1/1968 | Heesacker | 60/39.47 |
| 3,616,646 | 11/1971 | Mikeska et al. | 60/255 |
| 3,901,028 | 8/1975 | Leingang | 60/245 X |
| 3,916,618 | 11/1975 | Araki et al. | 60/39.47 |
| 3,946,557 | 3/1976 | Macbeth | 60/253 |
| 4,116,131 | 9/1978 | Shafer et al. | 60/255 X |
| 4,187,676 | 2/1980 | O'Neil et al. | 60/255 |
| 4,421,004 | 12/1983 | Hallstrom et al. | 264/3 R |
| 4,450,768 | 5/1984 | Bell | 264/3.1 X |
| 4,455,914 | 6/1984 | Christmann et al. | 264/3.1 X |
| 4,489,657 | 12/1984 | Langer | 264/3.1 X |

FOREIGN PATENT DOCUMENTS

1160455 1/1984 Canada .................................. 264/3.3

Primary Examiner—Peter A. Nelson
Attorney, Agent, or Firm—Bobby D. Scearce; Donald J. Singer

[57] ABSTRACT

An adjustable restraint assembly connectable between a dome portion of a solid propellant rocket motor casing and a rigid base or support, for use during the curing of a propellant in the casing. The assembly includes an upper attach bracket connectable to the dome portion, a lower attach bracket connectable to a rigid base, upper and lower flanges connected to the upper and lower brackets, respectively, and an adjustable threaded turnbuckle-like member connected between the flanges. The assembly is used to establish a maximum net downward deflection of the dome portion upon maximum pressurization of the uncured propellant in the motor casing and is thereafter adjusted at various times during the curing process to reduce and ultimately eliminate the deflection in increments to thereby improve the bond between the grains of the cured propellant and the casing in the region of the forward dome.

8 Claims, 4 Drawing Figures

METHOD OF CONSTRUCTING A DOME RESTRAINT ASSEMBLY FOR ROCKET MOTORS

RIGHTS OF THE GOVERNMENT

The invention described herein may be manufactured and used by or for the Government of the United States for all governmental purposes without the payment of any royalties.

This is a division, of application Ser. No. 586,952, filed Mar. 7, 1984, now U.S. Pat. No. 4,577,542.

BACKGROUND OF THE INVENTION

This invention relates generally to an assembly and method for producing a maximum net outward deflection of a forward or aft dome portion of a rocket motor during a solid propellant curing operation and for reducing such deflection in stages at different times during the curing process.

It has long been known that when a propellant is cured under high pressure in a solid propellant rocket motor, the propellant containing motor casing tends to expand in a non-uniform manner. Similarly, when the pressure is reduced in the casing during the curing process, the casing tends to contract in a non-uniform manner. Moreover, as the propellant cures, it tends to shrink inwardly, sometimes resulting in high localized stress fields in the propellant grain at the boundary of the grain/case bond. High localized stress fields and disruptions of the bond between the propellant grain and motor casing have been particularly pronounced in the region of the forward and aft domes. The problem has been recognized as significant in high pressure cured solid propellant motors having both relatively rigid steel casings as well as those having flexible, filament wound casings such as the Boeing SRM-1 and SRM-2 large and small inertial upper stage motors used in the shuttle orbitor program.

By means of my invention, the deleterious effects of this problem are substantially minimized if not altogether eliminated.

SUMMARY OF THE INVENTION

It is an object of my invention to provide an adjustable restraint assembly connectable between a dome portion of a rocket motor case and a rigid base or support to produce a net outward deflection in the dome during the process of curing a solid propellant therein and for reducing the net outward deflection in increments as the curing pressure is reduced, to thereby minimize localized grain stress fields in the region of the bond between the cured propellant and the dome portion of the case.

It is a further object of my invention to provide a method for improving the bond between a cured solid propellant and a dome portion of a rocket motor casing containing such propellant.

Briefly, in accordance with my invention, there is provided a dome restraint assembly for use in a solid fuel rocket motor during a propellant curing operation. The assembly includes first attaching means connectable to a dome of a rocket motor and a second attaching means connectable to a rigid base or support. Lastly, a means is adjustably connected between the first and second attaching means for selectively adjusting the spacing between the first and second attaching means.

These and other objects, features and advantages of my invention will become apparent to those skilled in the art from the detailed description and attached drawings upon which, by way of example, only a single preferred embodiment of the invention is disclosed.

DESCRIPTION OF THE PREFERRED EMBODIMENT

Figure 1:
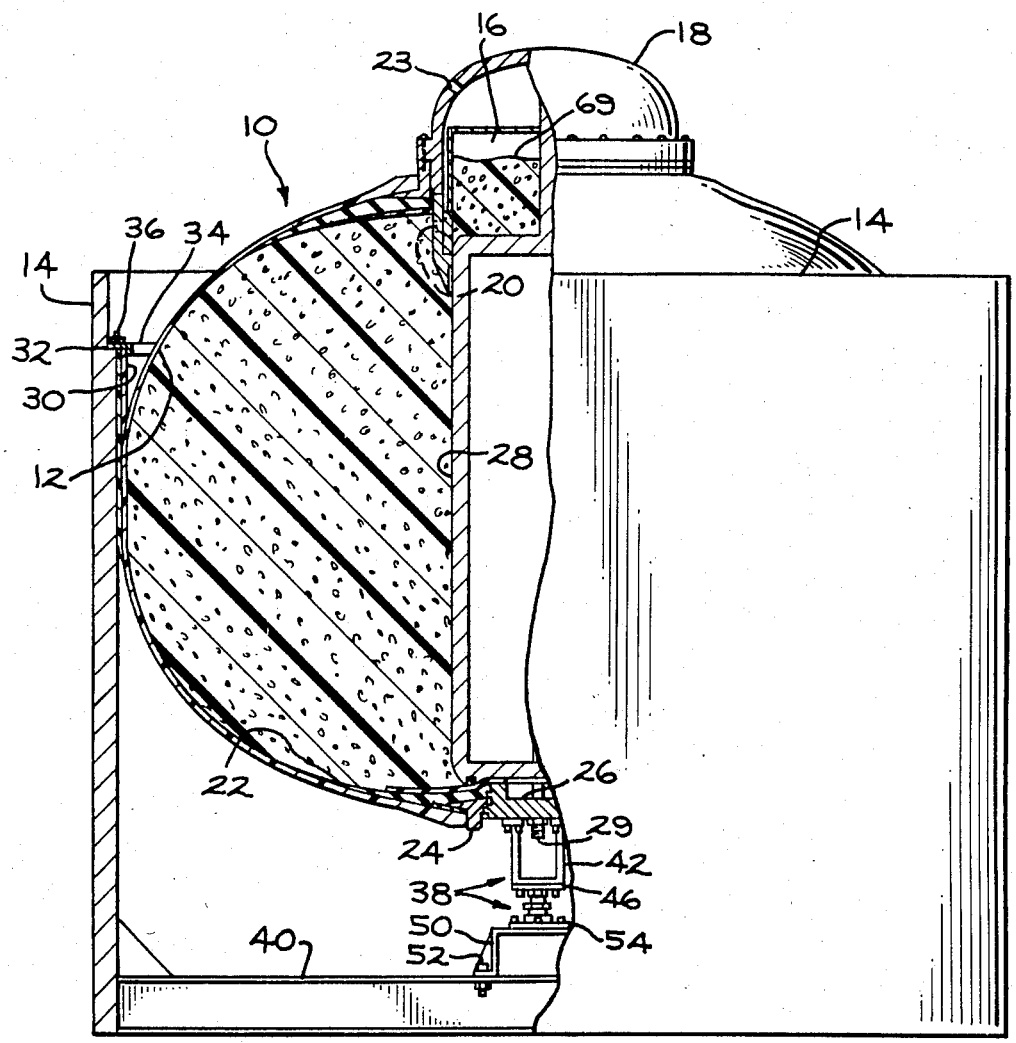
FIG. 1 shows a side elevation view of a conventional solid propellant rocket motor disposed in a support stand of the type used during a propellant loading and curing process, each having parts torn away to expose a forward motor dome restraint assembly representing one preferred embodiment of my invention.
Figure 2:
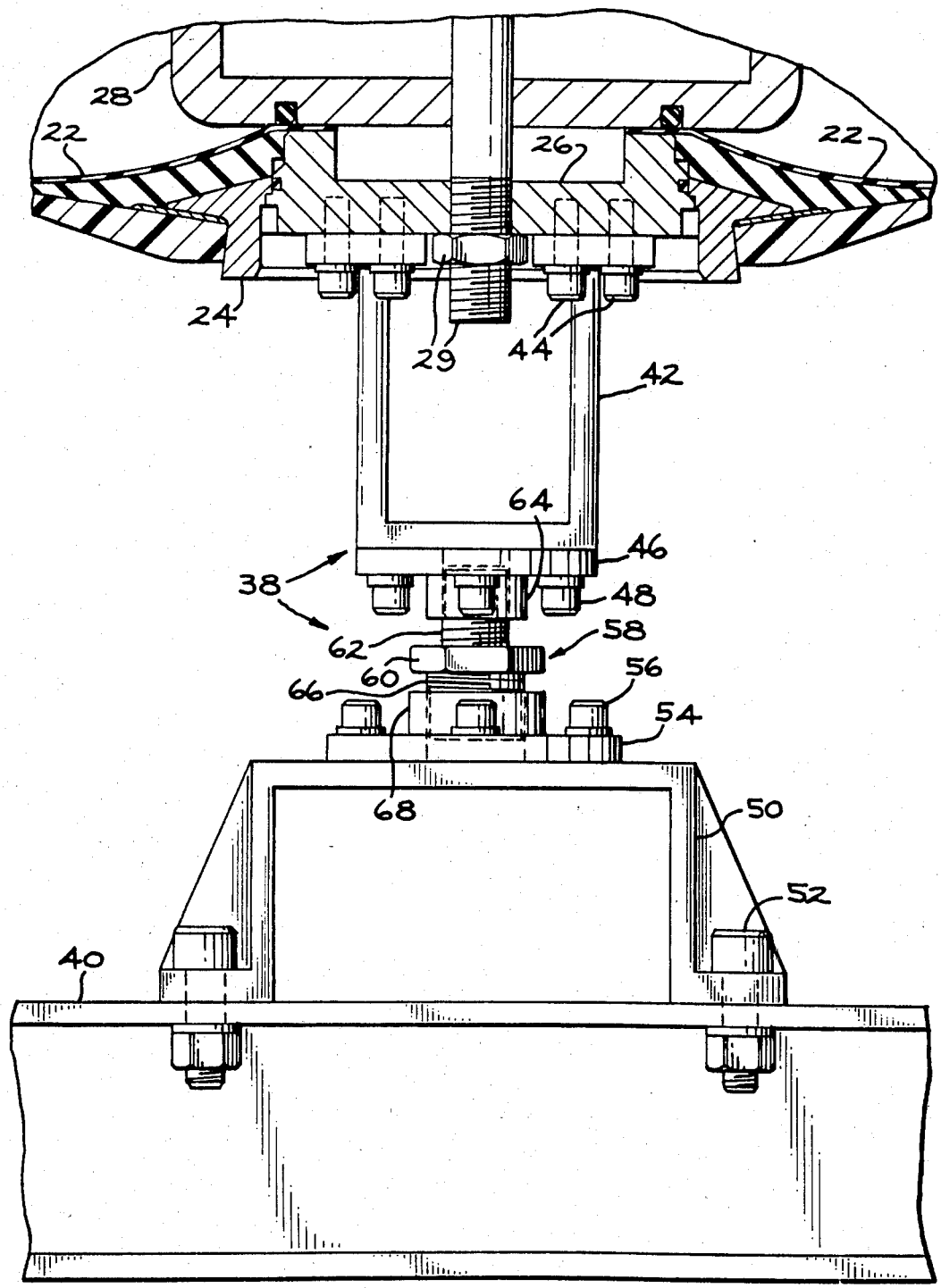
FIG. 2 shows an enlarged side elevation view of the restraint assembly of FIG. 1.
Figure 3:
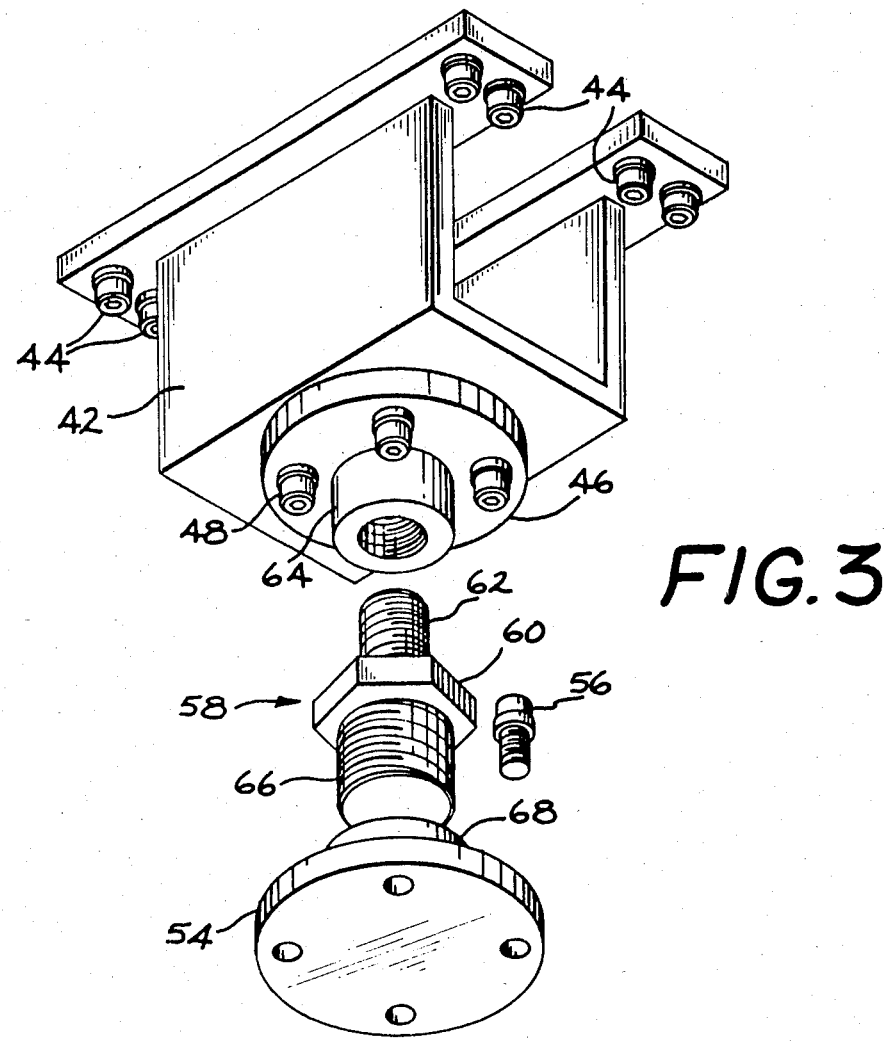
FIG. 3 shows an oblique projection of certain parts of the restraint assembly of FIGS. 1-2.

Referring now to the drawing figures, particularly FIGS. 1-3, there is shown, in one preferred embodiment of my invention, a conventional solid propellant rocket motor 10 having a flexible, resilient, filament wound case 12 suspended in a cylindrically shaped support stand 14 of the type used during propellant loading and curing operations. The motor 10 of the present example includes a propellant reservoir chamber 16 disposed within an aft dome 18 which communicates by means of a port 20 with a propellant main chamber 22. Uncured, liquidous propellant is introduced into the reservoir 16 and thereafter, the main chamber 22 through a port 23 in the aft dome 18. Also included is a forward dome polar boss 24 which is imbedded in the case 12 which contains a threaded central opening therethrough in which a similarly threaded circular adapter plate 26 is tightly secured. A cylindrically shaped mandrel 28, which is removably disposed within the case 12 during propellant loading and curing operations, is securely attached to the aft dome 18, and only loosely connected to the plate 26 by means of a nut and bolt combination 29. Accordingly, during the propellant loading and curing operation, the forward boss 24 and plate 26 will be movable downwardly away from the forward (lower) end of the mandrel 28 by at least a minimum preselected distance as hereafter more fully explained.

The motor 10 is suspended in the stand 14 from excess strands 30 of filamentary material left over after the case 12 has been wound. End portions of the strands 30 are secured between a circular ledge 32 formed around an interior wall of the stand 14 and an overlying annularly shaped angle bracket or aft skirt 34. The skirt 34 is fastened to the ledge 32 by means of a series of bolts 36 circumferentially spaced therearound.

Now in accordance with my invention, there is shown a forward dome or boss restraint assembly 38 connected between the forward polar boss adapter plate 26 and a suitably rigid base which, in the present example, consists of a single steel I-beam 40. The beam 40 is connected to opposing base portions of the stand 14 and extends across the hollow interior thereof. The assembly 38 includes an upper attach bracket 42 connected to the plate 26 by suitable fasteners 44, an upper flange 46 connected to the bracket 42 by fasteners 48, a lower attach bracket 50 connected to the beam 40 by fasteners 52, a lower flange 54 attached to the bracket 50 by fasteners 56, and an adjustable screw coupling 58 connected between the flanges 46 and 54. The screw coupling 58 of the present example is a unitary element having a central portion formed in the shape of a hex-nut 60 for rotational adjustment by means of a wrench, an upper portion forming a first threaded shaft 62 which is inserted into a similarly threaded collar 64 of the flange 46, and a lower portion forming a second threaded shaft 66 inserted into a similarly threaded collar 68 of the flange 54. The threads of the shafts 62 and 66 are wound oppositely from one another as shown most clearly in FIG. 2 so that, as the nut portion 60 is adjusted in one direction of rotation, the flanges 46 and 54 are drawn toward one another, and as the nut portion 60 is adjusted in the other direction of rotation, the flanges 46 and 54 are moved away from one another. Assuming the beam 40 is rigidly fixed in position, adjustment of the nut portion 60 in one direction will pull the flange 46, bracket 42, plate 26 and boss 24 downwardly, while adjustment of the nut portion 60 in the reverse direction will force the same components to move upwardly.

Operation of the boss restraint assembly 38 during the process of loading and curing propellant in a standard SRM-1 rocket motor, as represented in the present example by the motor 10, will now be explained. Initially, the motor 10, with chambers 16 and 22 empty, is lowered into the support stand 14 over the assembly 38 and secured to the skirt 34 as previously discussed. The resulting assembly as shown in FIG. 1 is placed in the heating chamber of a suitable oven, not shown. The nut at 29 is loosened to permit the plate 26 and lower end of the mandrel 28 to move apart vertically by about 0.30 inch. The fasteners 48 are removed so that the upper flange 46 is supported entirely by the threaded portion 62 and the hex-nut 60 is adjusted so that there exists a small gap between the upper flange 46 and the underside of the bracket 42 of from 0.0100–0.020 inch. Thus, the boss 24 will not be restrained from being pushed downwardly during the subsequent operation of filling the chamber 22 with propellant.

Next, uncured liquidous propellant 69 is introduced through the port 23 into the reservoir chamber 16 and thence into the main chamber 22 through the port 20 under a casting pressure of about 25 psig. After the chamber 22 has been completely filled as evidenced by a residual level of propellant in the reservoir chamber 16, the fasteners 48 are inserted and tightened in the flange 46 and the hex-nut 60 is adjusted to eliminate the gap between the upper flange 46 and attach bracket 42. This adjustment should be just sufficient to maintain the upper bracket 42 and flange 46 in contact without causing any upward vertical or horizontal twisting motion of the attach bracket 42 at this time or during the oven baking and curing operation to follow.

Next, the hex-nut 60 is adjusted to induce a downward movement of the upper flange 46 and attach bracket 42 to, in turn, downwardly deflect the plate 26 and forward polar boss 24. Ideally, the adjustment should be just sufficient to deflect the forward boss 24 downwardly by an amount equal to the anticipated shrinkage of the propellant upwardly away from the boss 24 during the curing process to follow, minus any significant upward deflection of the support beam 40 resulting from this adjustment. The chambers 16 and 22 are now pressurized through the port 23 with nitrogen gas at a pressure of 280 psig ± 10 psig to begin the curing process. As this high pressure is applied, the flexible case 12 tends to expand radially outwardly toward the interior wall of the stand 14 such that the forward boss 24 tends to be pulled upwardly by an amount dependent upon the stiffness of the beam 40. The goal is to obtain a net downward displacement of the boss 24 under the restraint of the assembly 38 during the period of application of the highest curing level pressure beyond what the downward displacement level of the boss 24 would have been if the restraint assembly 38 had not been in use. In the case of a standard SRM-1 motor, the net downwardly deflection should be 0.2 inch after the internal pressure in the chamber 22 has reached its maximum value at the commencement of the curing process.

Figure 4:
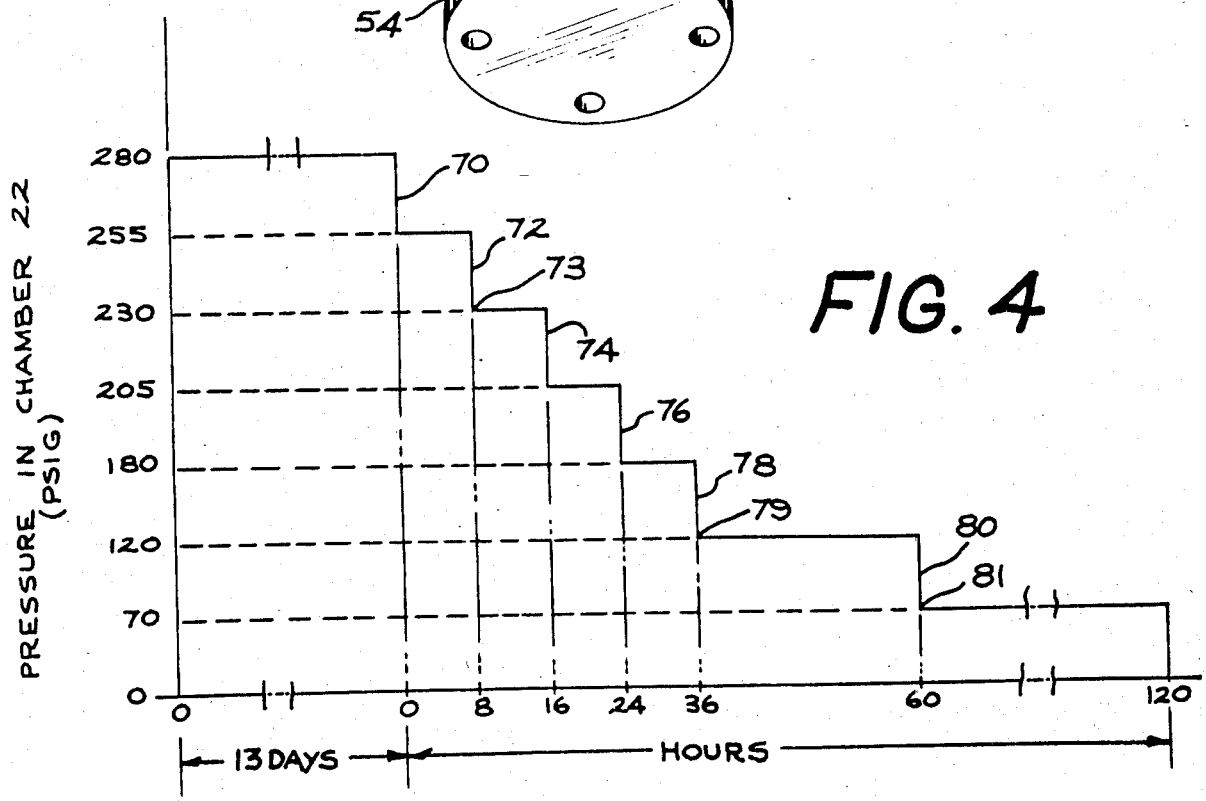
FIG. 4 shows a graphical step function of pressure applied to a curing propellant within a chamber of the motor of FIGS. 1-2 versus curing time in days and hours, illustrative of one preferred propellant curing method of my invention.

Referring now also to FIG. 4 and having satisfied the aforementioned requirements, the 280 psig propellant cure level pressure is maintained in the chambers 16 and 22 for about 13 days while the motor 10 is subjected to a constant oven temperature of about 140° F. At the end of this time period, the oven temperature is reduced to a motor storage temperature range of 50°–70° F. and the gas pressure in the reservoir 16 is reduced until the pressure in the chamber 22 has decreased to about 255 psig as at 70 in FIG. 4. This condition is maintained for about 8 hours at the end of which time period the pressure in the chamber 22 is reduced by a second 25 psig increment as at 72 to about 230 psig and the hex-nut 60 is adjusted with a wrench in approximately quarter turn increments until the forward boss 24 moves upwardly a distance of from 0.06 to 0.07 inches. This is the first of three such adjustments to be made in the deflection level of the boss 24 and occurs at the position marked 73 in FIG. 4.

A pressure of 230 psig is thereafter maintained in the case 22 for 8 hours to the 16 hour point in FIG. 4, at which time gas is again bled from the case 12 until the pressure in the chamber 22 falls to 205 psig as at 74. Eight hours later, at the 24 hour level, the pressure in the chamber 22 is again reduced by 25 psig to the 180 psig level as at 76 and maintained at this pressure for an additional 8 hours. At the 36 hour point, the pressure in the chamber 22 is reduced by 60 psig to 120 psig as at 78, and the hexnut 60 is adjusted a second time in quarter turn increments until the boss 24 moves upwardly an additional 0.06–0.07 inches, as at 79. Pressure in the chamber 22 is thereafter maintained at 120 psig for 24 hours to the 60 hour point at which time the chamber pressure is reduced by a 50 psig increment to 70 psig, as at 80, and a final adjustment of the nut 60 is made to completely remove the downward loading on the boss 24 by the assembly 38 as at 81. To complete the present example, the chamber 22 is maintained at an internal pressure of 70 psig for an additional 60 hours to the 120 hour point in FIG. 4 at which time the internal pressure in the case 12 is bled to 0 psig after which the usual removal sequence for the reservoir 16 and mandrel 28 is conducted.

While it has been found preferable to loosen the boss restraint assembly of my invention in several steps, as for instance, in three separate steps as indicated in the previous example, a greater or lesser number of incremental adjustments may be employed with varying degrees of success. Under the most ideal circumstances, of course, it would be preferable, although perhaps impractical and unnecessary, to continually loosen the restraint assembly as shrinkage in the propellant occurs in the vicinity of the forward dome of the motor during the curing process.

The net downward deflection of the forward dome polar boss to be established initially when using my restraint assembly on any given solid fuel rocket motor during the propellant loading and curing process will depend upon a number of factors including the size and shape of the particular motor, the shrinkage characteristics of the particular propellant used, and the stiffness of the base support means or beam to which the restraint assembly is connected. Moreover, the rate at which a given propellant is cured, its curing temperature and pressure levels, and deflection of the forward boss when unrestrained during the fuel loading process are additional factors which may or will have a bearing on the selection of initial downward deflection adjustments of the forward boss. Accordingly, in the case of each different motor, propellant and curing process employed, some experimentation will be necessary in order to determine the most desirable initial net downward deflection of the forward dome of the motor casing to be established for best results. It will also be appreciated that my restraint assembly and method for its use may also be employed with beneficial results on rocket motors having relatively inflexible cases such as those made of steel.

Although the present invention has been explained with respect to specific details of one preferred embodiment thereof, it is not intended that such details limit the scope of the foregoing claims otherwise than as specifically set forth therein.

I claim:

1. A method for improving the bond between a cured solid propellant in a rocket motor and a dome portion of the case of said motor, the steps of which comprise:

providing a substantially rigid base fur supporting said case of said motor;

attaching an adjustable restraint assembly between said dome portion and said rigid base;

loosening said restraint assembly prior to loading said case of said motor with uncured propellant to permit maximum downward deflection of said dome portion after said uncured propellant is loaded in said case of said motor but before maximum curing pressure is applied to the propellant in said case of said motor;

loading said case of said motor with uncured propellant;

expanding said restraint assembly between said dome portion and said base to a maximum extent without producing upward deflection or horizontal twisting of said dome portion;

pressurizing said propellant in said case of said motor to a maximum predetermined curing pressure level;

compressing said restraint assembly to produce a net downward deflection of said dome portion essentially equal to the amount of shrinkage of said propellant upwardly away from said dome portion anticipated as a result of the curing of said propellant; and thereafter expanding said restraint assembly in increments in at least two separate steps at different times during the propellant curing process to permit said dome portion to deflect upwardly toward said propellant to a normal position wherein no downward deflection of said dome portion is produced by said restraint assembly.

2. The method of claim 1 wherein the step of expanding said restraint assembly in increments is performed in three separate steps at different times during the propellant curing process.

3. The method of claim 2 wherein said three increments of expanding said restraint assembly occur at the conclusion of a second, fifth and sixth incremental reduction of pressure in the propellant containing case of said motor in a curing process involving a total of seven separate incremental reductions of pressure in said case, said increments of expansion of said restraint assembly being approximately equal.

4. The method of claim 1 wherein said restraint assembly comprises:

first attaching means for connection to said dome portion;

second attaching means for connection to said rigid base; and a screw coupling connected between said first attaching means and said second attaching means for selectively adjusting the spacing between said dome portion and base.

5. The method of claim 4 wherein said first attaching means comprises a U-shaped bracket, and said restraint assembly further comprises means for attaching said bracket to said dome portion.

6. The method of claim 4 wherein said restraint assembly further comprises a first flange member connected to said first attaching means and a second flange member connected to said second attaching means, said screw coupling being connected between said first flange member and said second flange member.

7. The method of claim 1 wherein said restraint assembly comprises:

first attaching means for connection to said dome portion, and a first flange member connected to said first attaching means;

second attaching means for connection to said rigid base, and a second flange member connected to said second attaching means;

adjusting means connected between the first and second flange members for selectively adjusting the spacing between said first attaching means and said second attaching means, said adjusting means including a unitary element containing a central portion forming an adjustable nut, an upper threaded portion extending from one broad surface of said nut portion, and a lower threaded portion extending from the other broad surface of said nut portion, said upper and lower threaded portions containing screw threads wound oppositely from one another, said first and second flange members containing collars defining hollow shafts therein threaded in conformity with the threads on said first and second threaded portions, respectively.

8. The method of claim 7 wherein said first attaching means comprises a U-shaped bracket, and said restraint assembly further comprises means for attaching said bracket to said dome portion.

* * * * *